(12) United States Patent
Terwilleger (10) Patent No.: US 6,298,807 B1
(45) Date of Patent: Oct. 9, 2001

(54) TOP UNLOADING TAPERED BARREL CLAW

(75) Inventor: Arthur R. Terwilleger, Kansas City, MO (US)

(73) Assignee: Delaval, Inc., Kansas City, MO (US)

( * ) Notice: Subject to any disclaimer, the term of this patent is extended or adjusted under 35 U.S.C. 154(b) by 0 days.

(21) Appl. No.: 09/287,992

(22) Filed: Apr. 8, 1999

(51) Int. Cl.$^7$ ........................................ A01J 5/00
(52) U.S. Cl. .............................. 119/14.16; 119/14.54
(58) Field of Search .............. 119/14.54, 14.01, 119/14.37, 14.15, 14.16

(56) References Cited

U.S. PATENT DOCUMENTS

| | | |
|---|---|---|
| D. 324,591 | 3/1992 | Lallerstedt . |
| D. 327,552 | 6/1992 | Lallerstedt . |
| D. 372,566 | 8/1996 | Chowdhury . |
| D. 384,445 | 9/1997 | Chowdhury . |
| D. 418,951 | 1/2000 | Gustafsson . |
| 1,348,401 | 8/1920 | Frimand . |
| 1,396,987 | 11/1921 | Bodeker . |
| 1,647,971 * | 11/1927 | Schmitt ............................ 119/14.16 |
| 2,513,627 * | 7/1950 | Dinesen ............................ 119/14.16 |
| 2,694,380 | 11/1954 | Harstick . |
| 3,233,589 | 2/1966 | Karnath . |
| 3,512,504 | 5/1970 | Marley . |
| 3,776,196 | 12/1973 | Luiz . |

(List continued on next page.)

FOREIGN PATENT DOCUMENTS

| | | |
|---|---|---|
| 105472 | 10/1938 | (AU) . |
| 229063 | 6/1960 | (AU) . |
| 238486 | 5/1962 | (AU) . |
| 171749 | 11/1921 | (DE) . |
| 552476 | 4/1943 | (DE) . |
| 3140543 | 4/1983 | (DE) . |
| 71624 | 11/1992 | (DE) . |
| 868294 | 5/1961 | (GB) . |
| 992771 | 5/1965 | (GB) . |
| 2044066 | 10/1980 | (GB) . |
| 2057845 | 4/1981 | (GB) . |
| 1175402 | 8/1985 | (SU) . |
| WO8500270 | 7/1984 | (WO) . |

OTHER PUBLICATIONS

Bramley, A.J.; Dodd, F.H.; Mein, G.A.; and Bramley, J.A., Editors; *Machine Milking and Lactation*, published by Insight Books, 1992, pp. 164–170 and 188–189.
Alfa Laval Agri, *Equipment & Supplies*,1997, pp. 28–29.
Colburn Barrel Claw, about 1991.
Alfa Laval Claw, about 1991, manufactured by Boudreau.

*Primary Examiner*—Thomas Price
(74) *Attorney, Agent, or Firm*—Hovey, Williams, Timmons & Collins (57) ABSTRACT

A barrel claw of increased volumetric capacity without sacrificing ergonomics has a normally horizontally disposed, elongated hollow body having a generally cylindrical central portion and a pair of tapered, conical end portions on opposite sides of the central portion. Viewing windows at opposite ends of the body permit observation of the internal chamber from outside the body. Inlet openings from the teat cups are provided in the top wall section of the body in the tapered end portions thereof so that the inlets are properly angled toward the teats of the cow's udder during use of the claw. An integrated discharge spout and pulsation manifold unit is removably attached to the top of the body in any one of a number of rotative positions so as to most advantageously position the radially projecting spout of the unit relative to the observation windows and other equipment associated with the milking system. Alternative embodiments provide either rigid nipples on the claw body or a nipple-free construction in which teat cup liners are inserted directly into the inlet openings in the body and retained in place by such openings. Other variations include threaded and non-threaded means for securing the spout and manifold unit onto the claw body.

39 Claims, 3 Drawing Sheets

U.S. PATENT DOCUMENTS

| | | |
|---|---|---|
| 4,253,419 | 3/1981 | Yang . |
| 4,314,526 | 2/1982 | Nordenskjold . |
| 4,516,592 | 5/1985 | Schultz et al. . |
| 4,537,152 | 8/1985 | Thompson . |
| 4,807,566 | 2/1989 | Chowdhury . |
| 4,873,943 * | 10/1989 | Pulvermacher ................... 119/14.16 |
| 4,957,065 | 9/1990 | Neff et al. . |
| 5,076,211 | 12/1991 | Tonelli . |
| 5,080,041 | 1/1992 | Steingraber . |
| 5,291,853 | 3/1994 | Steingraber et al. . |
| 5,345,390 | 9/1994 | Petersson et al. . |
| 5,988,105 | 11/1999 | Sandgren . |
| 6,006,695 | 12/1999 | Gustafsson . |
| 6,055,930 | 5/2000 | Stein et al. . |
| 6,058,880 | 5/2000 | Gustafsson et al. . |

\* cited by examiner

TOP UNLOADING TAPERED BARREL CLAW

TECHNICAL FIELD

This invention relates to milking equipment and, more particularly, to an improved barrel-style milking claw used to collect milk from the four teats of a cow's udder and discharge it into a single tube toward a remote point of delivery.

BACKGROUND

Conventional barrel claws have certain advantages and disadvantages compared to "upright" claws having dish-shaped bottom halves constructed of glass or plastic. For example, barrel claws generally fit more comfortably into the palm of the user's hand during installation, removal and maintenance, making them attractive for this reason. Additionally, because a barrel claw is oriented with its longitudinal axis extending horizontally during operation, the continuous, cylindrical wall of the claw forms a sturdy, protective shell that is not easily damaged if the claw should accidentally be dropped onto the concrete floor of the milking parlor. Observation windows at opposite ends of the claw are likewise well protected, as opposed to the dish-shaped bottom or top halves of other claws which are exposed and vulnerable to breakage when dropped or stepped on by a cow.

On the other hand, the transparent bottom or top halves of the upright claws permit their interior receiving chamber to be viewed from virtually any angle, making them equally suitable for use in a variety of different styles of milking parlors, including, for example, parallel parlors, herringbone parlors and tandem parlors. Depending upon the type of parlor involved, the operator may be positioned in different locations as he observes and tends the milking operation, and the hoses and other parts of the milking system may be located in different places and extend in different directions.

Furthermore, in prior barrel claws the ports for pulsation lines to the teat cups and the main discharge spout of the claw have been separate, individual components requiring separate handling and attachment and detachment to and from the claw.

The cylindrical shell of barrel claws has also presented certain manufacturing problems during the attachment of four, rigid tubular nipples to the exterior of the shell to which teat cups liners are attached. Due to the location of the cow's four teats, it has heretofore been necessary to attach the rigid nipples at oblique angles to the claw body in order to have the teat cup liners extending from the body at appropriate angles for connection to the teats. This fabrication process has been difficult and time consuming.

In addition, while barrel claws have been popular due in part to their comfortable fit in the operator's hand, to some extent this comfortable, cylindrical configuration has been at the expense of volumetric capacity of the claw. While the barrel diameter could be increased to correspondingly obtain increased capacity, enlarging the diameter of the cylinder would also make it less comfortable to grip.

SUMMARY OF THE INVENTION

Accordingly, a primary object of the present invention is to provide an improved claw for the milking industry that retains the significant and popular attributes of conventional barrel claws while eliminating many of the current disadvantages.

To this end, the present invention contemplates a barrel claw that retains the overall generally cylindrical configuration of prior barrel claws but which has opposite, tapered end portions of generally conical shape so that volumetric capacity of the claw can be increased to some extent in the center of the claw while still permitting the claw to fit comfortably in the user's hand, giving superior ergonomics when grasped from any direction. The conical wall surfaces of the claw's tapered end portions permit rigid nipples for the teat cups to be welded to such surfaces at right angles while still pointing in the proper direction toward the cow's teats. Thus, manufacturing is simplified and made more efficient. With the end portions having angled walls, it is also possible to provide an embodiment which eliminates the rigid nipples altogether and uses instead four inlet openings in the tapered portions of the top wall section of the body to which the flexible hoses of the teat cup liners can be secured. The ends of the hoses project through the openings while yieldable retaining flanges on the innermost ends help hold the hoses in place.

In one preferred embodiment, the manifold for the pulsation system that alternately squeezes and relaxes the teat cup liners when attached to the teats is integrated or joined with the milk discharge spout of the outlet assembly as a common unit. The combination spout and manifold unit is readily attachable and detachable from the top wall section of the claw body. The integrated unit can be attached to the body in different rotative positions so that the outlet spout extends either axially or transversely of the longitudinal axis of the body, as may be best suited for the particular style of parlor in which the claw is being used insofar as observing the contents of the claw and positioning of the various lines and hoses is concerned.

These and other important objects will be made clear from the description and claims which follow:

DETAILED DESCRIPTION

Figure 1:
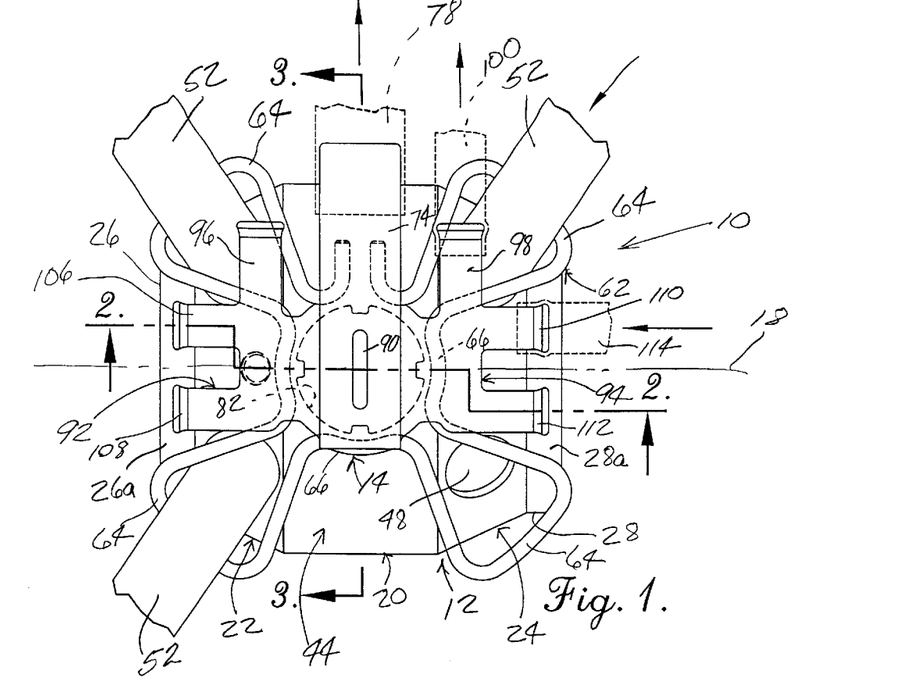
FIG. 1 is a top plan view of one embodiment of a barrel claw embodying the principles of the present invention.
Figure 2:
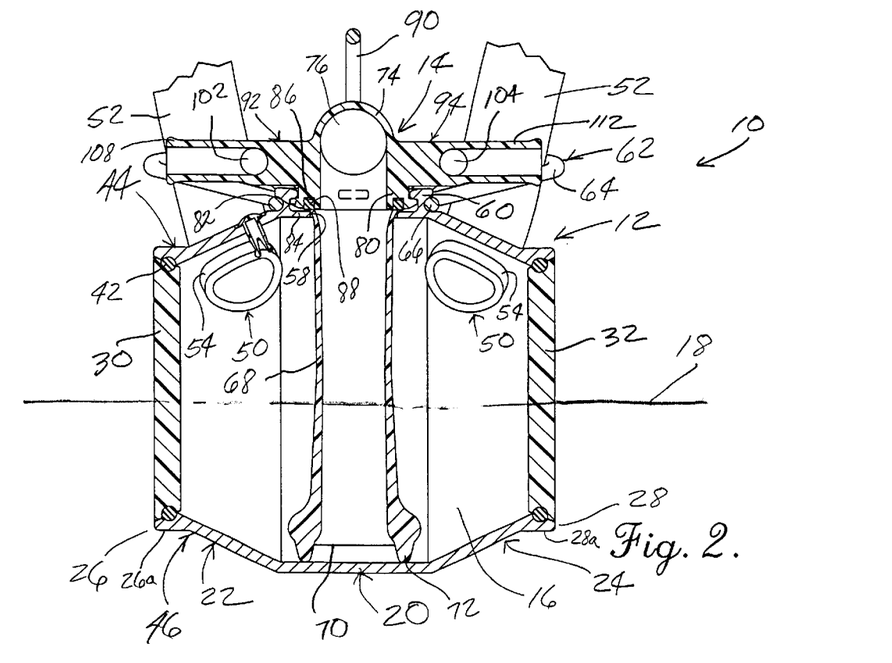
FIG. 2 is a longitudinal, vertical cross-sectional view through the claw of FIG. 1 taken substantially along line 2—2 of FIG. 1.

The claw 10 of FIGS. 1–4 comprises two primary parts, namely a generally barrel-shaped body 12 and a combination vacuum distribution manifold and discharge spout unit 14. The body 12 is hollow to present an internal, milk-receiving chamber 16 and is somewhat elongated so as to present a longitudinal axis 18 as shown in FIGS. 1 and 2. The body 12 includes a central cylindrical portion 20 and a pair of opposite, tapered end portions 22 and 24 that are each formed in the shape of a truncated cone. Opposite ends 26 and 28 of the body are smaller in diameter than the central portion 20 to give the body 12 its overall generally barrel-shaped configuration wherein the end portions 22 and 24 converge toward the respective ends 26 and 28.

Preferably, the body 12 is constructed from stainless steel to provide a sturdy shell for the chamber 16. A pair of circular observation windows 30 and 32 are provided at the two opposite ends 26 and 28 to permit the milking attendant to observe the milk flow within the chamber 16 from outside the body.

Figures 3, 4, 5:
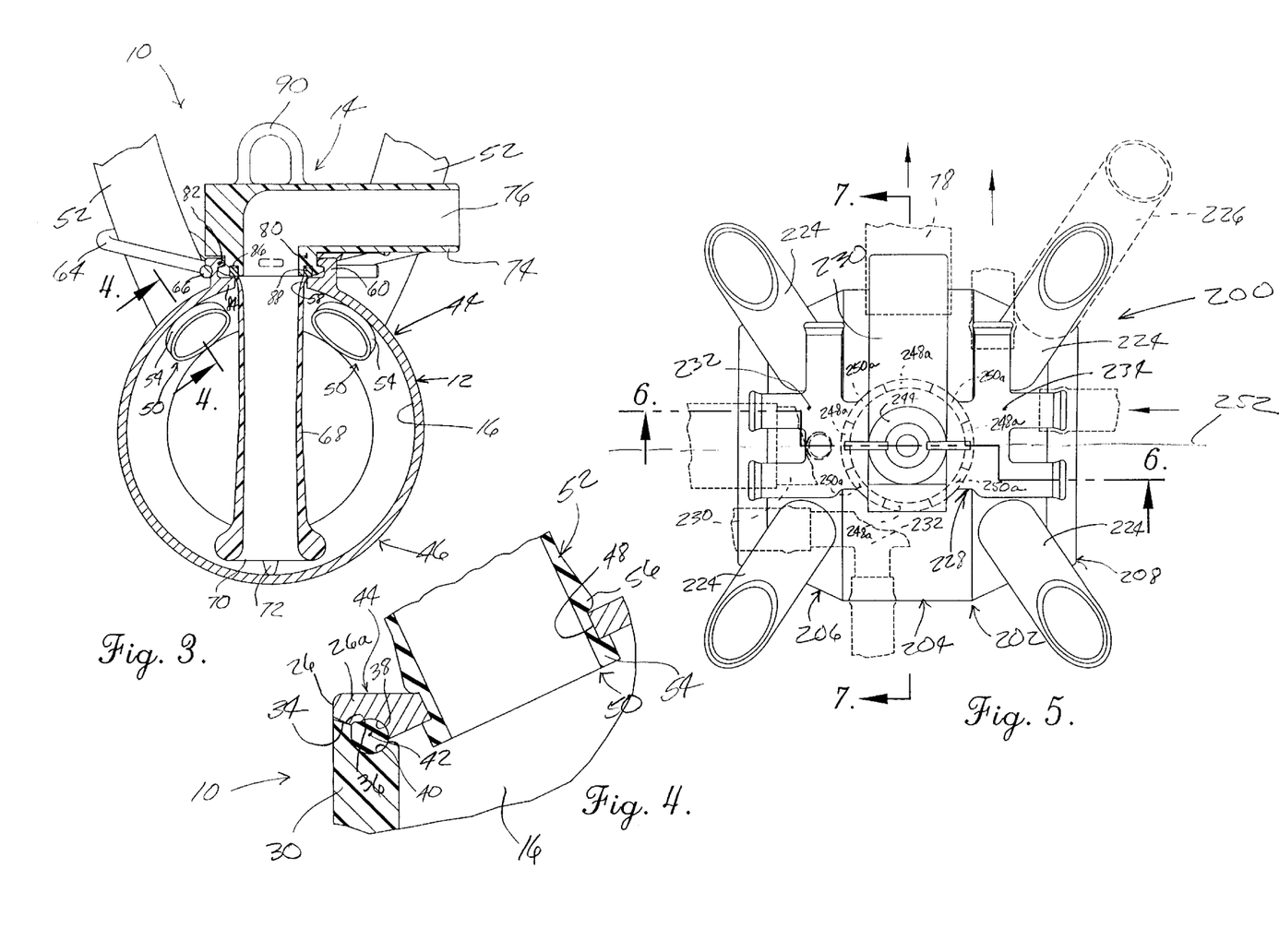
FIG. 3 is a transverse cross-sectional view through the claw of FIG. 1 taken substantially along line 3—3 of FIG. 1.
FIG. 4 is an enlarged, fragmentary detailed cross-sectional view of the claw of FIG. 1 taken substantially along line 4—4 of FIG. 3 and illustrating the manner in which the teat cup liner hoses fit directly into openings in the tapered end portions of the claw and the observation windows are removably retained at opposite ends of the claw body.
FIG. 5 is a top plan view of a second embodiment of barrel claw incorporating the principles of the present invention.

As illustrated in detail in FIGS. 2 and 4, each end 26 and 28 of the body has an annular rim of 26a or 28a of constant diameter. As shown in FIG. 4 with respect to rim 26a each rim has an interior, annular, beveled surface 34 that progressively decreases in diameter as the central portion 20 of the body is approached. The window 30 is disposed within the rim 26 and has its own beveled circumferential edge 36 that is complementally received within the beveled surface 34 so that the window 30 is securely seated within the rim 26. Preferably, the outermost face of the window 30 is flush with or slightly recessed from the corresponding outermost end surface of the rim 26.

The beveled surface 34 and the beveled edge 36 are provided with corresponding, oppositely facing annular grooves 38 and 40 that are substantially registered with one another when the window 30 is fully seated within the rim 26. A resilient, annular seal 42 of circular cross-sectional configuration is contained within the groove 40 of the window 30 and projects radially outwardly into the groove 38 of the rim 26 so as to yieldably retain the window 30 in place. Upon the application of sufficient manual pressure, the window 30 can be popped out of its seat for cleaning purposes and then readily replaced. Preferably, the windows 30 and 32 are constructed of clear plastic material, although they may also be constructed from glass.

The central portion 20 and the two conical end portions 22 and 24 include a top wall section broadly denoted by the numeral 44 and a bottom wall section broadly denoted by the numeral 46, both of such wall sections extending from one end 26 of the body to the opposite end 28 thereof. Generally speaking, as viewed in FIG. 3, the top wall section 44 comprises the top half of the body, while the bottom wall section 46 comprises the bottom half of the body. The two top and bottom wall sections 44 and 46 are integrally joined with one another and blend in smoothly with one another without a seam.

The top wall section 44 includes four inlet openings 48 (detailed in FIG. 4) for admitting milk from the teats of a cow's udder into the chamber 16. Two of the inlet openings 48 are disposed in the end potion 22, and remaining two are disposed in the opposite end portion 24. The inlet openings 48 are preferably located at about 30° degrees down from a top dead center position as viewed in FIG. 3 and extend radially through the conical top wall portion as viewed in a vertical plane as in FIG. 3. The openings 48 also extend at right angles to the inclined wall of each conical portion 22,24 as viewed in a longitudinal vertical plane in FIGS. 2 and 4.

Each inlet opening 48 is circular and, as shown in detail in FIG. 4, releasably retains the outlet end 50 of a flexible, preferably rubber, tubular teat cup liner 52. The teat cup liner 52 has an outer diameter corresponding substantially to the internal diameter of the opening 48 so that the liner can enter the opening 48, but an annular flange 54 about the exterior of the outlet end 50 is enlarged with respect to the opening 48 so as to prevent the liner 52 from being readily pulled loose. An annular bead 56 on the liner 52 inboard of the outlet end 50 and outside of the body 12 is also of greater diameter than the opening 48 so as to prevent the liner 52 from projecting too far into the chamber 16. Due to the conical nature of the end portions 22 and 24 and the attitude of the openings 48, the teat cup liners 52 project generally outwardly and upwardly in an advantageous manner for receiving milk when the cups (not shown) associated with the liners 52 are secured to the teats of the cow's udder.

The top wall section 44 has a centrally located hole 58. An upstanding, annular boss 60 circumscribes the hole 58 in radially spaced relation thereto. Around the outside of the boss 60 is disposed a wire formed retainer 62 having four petal-like loops 64 projecting radially outwardly from the axis of the hole 58, and a central, generally circular hub portion 66 that embraces and grips the boss 60. The teat cup liner 52 from each opening 48 projects upwardly through and beyond the corresponding loop 64 of the retainer 62, such loops 64 not only serving to confine and control the liners 52 but also to effectively shut them off by a crimping action at the completion of the milking operation when the cups have dropped from the teats and the liners 52 have been draped over and are hanging downwardly from the loops 64.

The hole 58 in the top wall section of the claw body receives and supports an upstanding extraction tube 68 that preferably takes the form of the extraction tube disclosed in U.S. Pat. No. 5,076,211. The extraction tube 68 has a lowermost intake end 70 situated near the interior surface of the bottom wall portion 46 of the claw body but spaced slightly upwardly therefrom by virtue of a plurality of feet 72. The upper end of the extraction tube 68 projects slightly through and beyond the hole 58 and is outwardly flared to a small extent. Preferably it is formed of plastic material to reduce weight.

The extraction tube 68 comprises a part of the outlet assembly of the claw 10 that is partially integrated into the combination manifold and spout unit 14. In addition to the extraction tube 68, the outlet assembly also includes a generally radially extending, rigid spout 74 formed of metal or plastic material or the like, such spout 74 having an internal, right angle passage 76 that communicates with the extraction tube 68. The radially outermost end of the spout 74 is adapted to be received by and inserted into the end of a flexible main discharge line 78 shown in phantom lines in FIG. 1. The line 78 leads to a point of downstream delivery for the milk and communicates a suction pressure from such downstream delivery site to the interior of the collecting chamber 16 and thence to the teats of the cow's udder via the liners 52.

The spout 74 has a depending, integral collar 80 of annular configuration that is adapted to be coaxially received by and within the boss 60 on the claw body 12.

The collar 80 and the boss 60 are provided with quarter turn, intermeshing threads 82 that permit the combination spout and manifold unit 14 to be quickly and easily attached to and removed from the body 12. Furthermore, because of the quarter turn nature of the threads 82, the spout and manifold unit 14 can be secured to the body with the spout 74 in any one of four radially projecting positions, i.e., transverse to the longitudinal axis 18 of the barrel in either of two positions (one of which is shown in FIG. 1), or parallel to the axis 18 projecting in either of two opposite directions. In this manner, the operator can readily orient the spout 74 and the viewing windows 30,32 in the best manner to suit the particular style of milking parlor involved.

FIGS. 2 and 3 illustrate that the top wall section 44 of the body has an annular ledge 84 that circumscribes the hole 58 inboard of the upstanding boss 60. A downwardly facing, annular groove 86 in the bottom face of the collar 80 partially overlies the ledge 84 and partially overlies the hole 58. Within the groove 86 is disposed an annular seal 88 that makes sealing engagement with the ledge 84 and the upper edge extremity of the extraction tube 68 when the spout and manifold unit 14 is secured down in place by the intermeshing threads 82 of the collar 80 and the boss 60. A rigid loop 90 projects upwardly from the top of the spout 74.

The combination spout and manifold unit 14 also includes a pair of vacuum manifolds 92 and 94 integrally joined to the spout 74 on opposite sides of the latter as shown in FIGS. 1 and 2. The manifolds 92 and 94 are structurally secured to and integrated with the exterior of the spout 74 but are not in communication with the passage 76 of the spout or the extraction tube 68.

The function of the manifolds 92 and 94 is to distribute pulsating negative and positive pressure to pulsation chambers of the teat cups so as to alternately squeeze and relax the liners during the milling action. As shown in FIGS. 1 and 2, each manifold 92,94 includes its own inlet port 96 in the nature of a tubular fitting that is adapted to receive a corresponding hose 100 (see FIG. 1) leading to a source of pulsating pressure. Each inlet port 96,98 communicates with its own internal bore 102,104 that is axially aligned with the respective port 96 or 98. The bores 102 and 104 do not communicate with one another within the manifold 92 and 94. Correspondingly, each manifold has its own pair of vacuum ports to its corresponding pair of teat cups, i.e., the manifold 92 has a pair of vacuum ports 106 and 108 communicating with the bore 102, while the manifold 94 has a pair of vacuum ports 110 and 112 communicating with the bore 104. FIG. 1 shows an exemplary pulsation line 114 in phantom lines connected to the vacuum port 110.

In use the claw 10 is oriented with the axis 18 of the claw body extending in a horizontal plane. The extraction tube 68 is inserted into one of the open ends of the body 26 or 28, then rotated into place in the top wall 44, and then the combination spout and manifold unit 14 is secured in place. As earlier mentioned, the radial position of the spout 74 relative to the axis 18 can be varied to best suit the conditions at hand and the style of the milking parlor involved. There are four sets of quarter turn threads 82 at the hole 58. Thus, the unit 14 can be attached to the claw body 12 with the spout 74 in any one of four different radial positions. Once the unit 14 is secured in place, the teat cup liners 52 are inserted into the openings 48 where they are retained in place by the flanges 54. The discharge line 78 is fitted onto the spout 74, the manifold vacuum supply hoses 100 are fitted onto ports 96 and 98, and the pulsation lines 114 are fitted onto the vacuum ports 106, 108, 110 and 112.

When the system is energized, a vacuum pump associated with the discharge line 78 creates a negative pressure within the chamber 16 which is in turn transmitted to the teat cup liners 52 so that the teat cups may be attached by suction to the teats of the cow's udder. Activation of the pulsation system causes alternating positive and negative pressure to be experienced within the manifolds 92 and 94, which in turn impart a pulsating action to the pulsation chambers that surround the teat cup liners within the teat cups. Thus, milk begins to flow from the cow's udder into the chamber 16, whereupon it is drawn up through the extraction tube 68 via the intake 70 and into the discharge line 78 for delivery to a downstream collection device.

It is important to note that during assembly, installation and removal of the claw 10, the claw body 12 is designed to fit comfortably in the user's hand due to the tapered end portions 22 and 24 of the body. The final diameter of the body at its opposite ends 26 and 28 is selected to be of such a diameter that the body can be readily grasped by the user from any direction in the area of the conical end portions 22 and 24. However, by having the central portion 20 of the claw body enlarged with respect to the opposite ends 26,28, the volumetric capacity of the claw can be increased without sacrificing ergonomics. Thus, the claw is rendered somewhat more stable and smooth operating due to the shape of the unit and the larger volume of milk that it can contain at any one time. Furthermore, the sloping walls of the end portions as shown in the cross-sectional view of FIG. 2 contribute to smooth, laminar flow of the milk within the chamber 16 towards the extraction tube 68. This also steadies the claw during operation to increase productivity and reduce the negative effects of turbulence that might otherwise be induced in the flow.

Due to the inclination of the top wall section 44 in the tapered end portions, the teat cup liners 52 can project from the claw body at the proper angle for approaching the teats of the cow's udder thus reducing liner slips due to poor alignment. This, too, encourages smooth flow by avoiding accidental crimping of the liners 52 that might obstruct the proper flow of milk.

By having the manifolds 92,94 and the spout 74 integrated into a common unit as part of the outlet assembly for the claw, the set up and disassembly of the claw are simplified, as well as cleaning and maintenance. Additionally, with the windows 30 and 32 retained by the seals 42 instead of by clips or other hardware, the claw body presents a clean, smooth overall configuration that is conducive to handling and clean up. While the seals 42 retain the windows 30 and 32 with sufficient resistance during operation, they can be readily "popped out" manually during clean up if desired. It will be noted that due to the mating bevels on the windows and the rims 26a,28a, the negative pressure within the chamber 16 during operation simply tends to seat the windows 30 and 32 even more snugly into their proper positions within the rims 26a,28a.

ALTERNATIVE EMBODIMENT

FIGS. 5–8 show a second embodiment 200 of a milking claw constructed in accordance with the principles of the present invention. The claw 200 is similar in many respects to the claw 10, the primary differences residing in the manner in which the teat cup liners are attached to the claw and the combination spout and manifold unit is secured to the claw body. Thus, the claw 200 will be described primarily with respect to the differences between it and the first embodiment, with the understanding that common features between the two embodiments are disclosed with respect to the first embodiment.

As with the first embodiment, the claw 200 has a tapered claw body 202 having a cylindrical central portion 204 and opposite end portions 206 and 208 that are conical to present a tapering configuration. As shown I FIGS. 6 and 7, the internal chamber 210 of the claw body 202 has four milk inlets 220 located in the top wall section 222 of the body.

Figures 6, 7, 8:
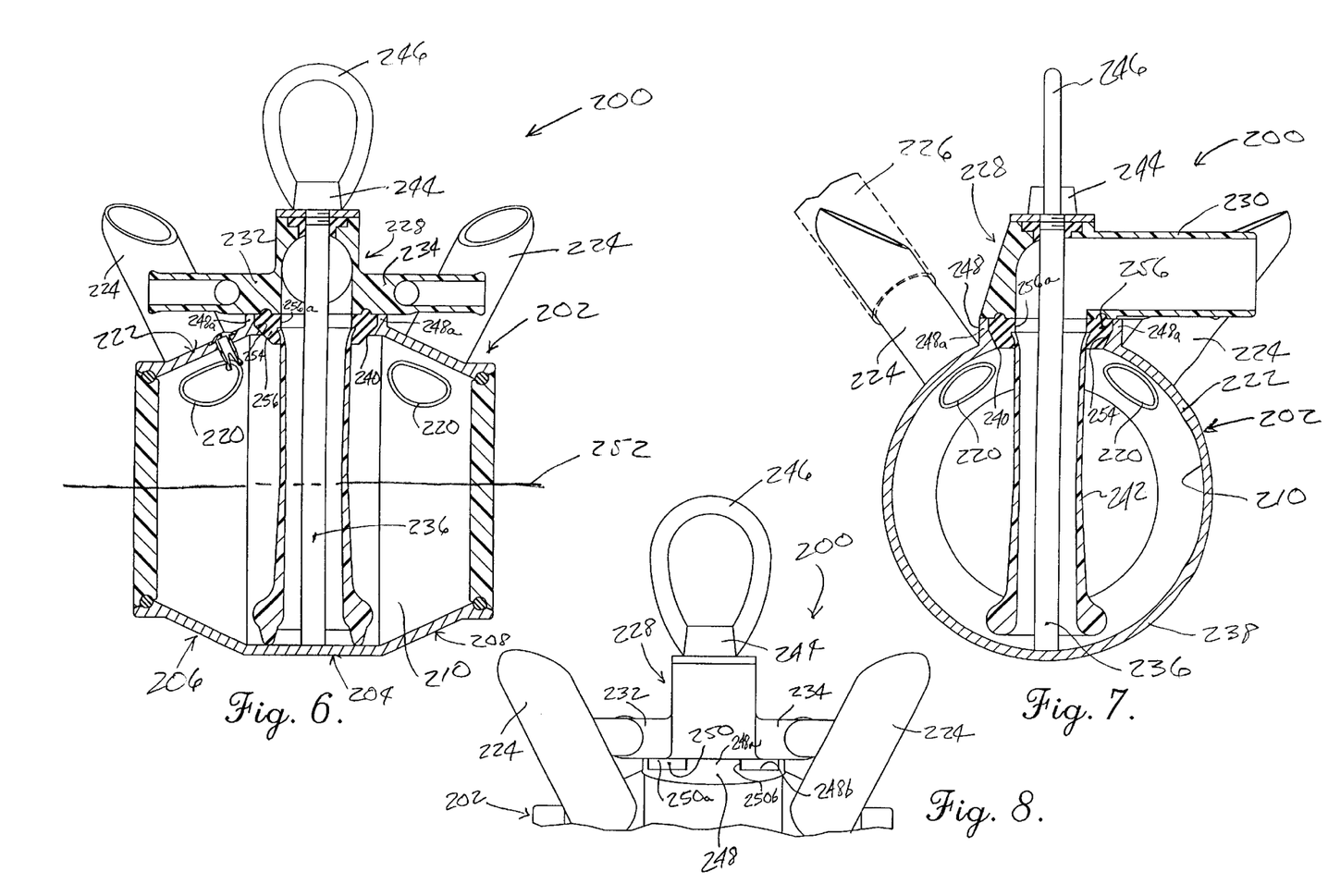
FIG. 6 is a longitudinal cross-sectional view through the claw of FIG. 5 taken substantially along line 6—6 of FIG. 5.
FIG. 7 is a transverse cross-sectional view through the embodiment of FIG. 5 taken substantially along line 7—7 of FIG. 5.
FIG. 8 is a fragmentary, side elevational view of the top portion of the embodiment of FIG. 5 illustrating the manner in which the top unit of the claw is secured to the claw body.

Two of the inlet openings 220 are located in the tapered end portion 206 and the other two are located in the tapered end portion 208. The inlet openings 220 communicate with four rigid, tubular nipples 224 that are welded to the top wall section 222 externally of the body in the tapered end portions 206 and 208. Each rigid nipple 224 intersects the sloping wall of the tapered portion 206 or 208 at a substantially 90° degree angle to such surface so as to project outwardly and upwardly therefrom at approximately 30°–40° degrees from the vertical as viewed both in a longitudinal vertical plane in FIG. 6 and a transverse vertical plane in FIG. 7. In this manner, the rigid nipples 224 advantageously project toward the four teats of the cow's udder to facilitate the milking process. As illustrated in FIGS. 5 and 7 in phantom lines, teat cup liners 226 fit onto and over the rigid nipples 224 to establish communication between the teat cups and the collecting chamber 210. By having the rigid nipples 224 disposed at right angles to the intersecting surfaces of the claw body, attachment of the nipples 224 to the body by welding during the manufacturing process is simplified.

The combination spout and manifold unit 228 of the second embodiment differs somewhat from that of the first embodiment. While the unit 228 includes a spout 230 and a pair of manifolds 232 and 234 that are virtually identical to the corresponding components of the first embodiment, this integrated unit 228 is attached to the body 202 in a different manner. In this respect, it will be noted that the body 202 has an internal, upstanding bolt 236 that is welded to the interior surface of the bottom wall section 238 in vertical registration with the hole 240 in the top wall section 222. The bolt 236 projects axially upwardly through the extraction tube 242, through and beyond the hole 240, and upwardly through and beyond the spout 230. The upper end of the bolt 236 receives a threaded nut 244 having the loop 246 rigidly integrated therewith. Thus, the nut 244 clamps down against the spout and manifold unit 228 when the unit is situated on top of the body 202, whereby to removably hold the unit 228 in place.

The claw 200 does not use quarter turn threads between the upstanding boss 248 on the claw body and the depending collar 250 (FIG. 8) on the spout and manifold unit 228. Instead, the boss 248 and the collar 250 are each segmented so as to present alternating, vertically extending tabs and slots. As shown in FIGS. 5 and 8, the upstanding tabs of the boss 248 are denoted by the numeral 248*a*, while the adjacent slots are denoted by the numeral 248*b*. Correspondingly, the depending tabs of the collar 250 are designated by the numeral 250*a*, while the slots of the collar are denoted by the numeral 250*b*. The tabs and slots 248*a*, 248*b* and 250*a*, 250*b* are all located at the same radial distance from the upright axis of the hole 240 such that the alternating tabs and slots can be interfitted beside one another when the claw is fully assembled as perhaps shown best in the top plan view of FIG. 5. By loosening the nut 244, the spout and manifold unit 228 can be raised sufficiently to disengage the tabs and slots so as to permit the unit to be rotated about the axis of the bolt 236 to a different location. Thus, the spout 230 can be selectively oriented in a number of radial positions relative to the upright axis of the extraction tube 242 and the longitudinal axis 252 of the claw body. Tightening down of the nut 244 after such orientation of the spout 230 once again firmly secures the unit 228 in its proper position.

The hole 240 in the top wall section of the claw body is enlarged somewhat compared to the hole 58 associated with the first embodiment. Moreover, the interior annular extremity of the boss 248 and the hole 240 has a chamfered surface 254 that defines a seat for an annular, truncated cone-shaped seal 256 that becomes wedged between the bottom of the spout unit 228 and the reducing diameter of the chamfered surface 254. The seal 254 has an internal central bore 256*a* that receives the upright bolt 236. In addition, the bore 256*a* snugly receives the upper flared end of the extraction tube 242 to maintain an effective seal between those two separate components when the claw is fully assembled. It will be noted that the boss 248 effectively defines a receiving socket for the seal 256, the lower tapering extremity of the seal 256 being complementally chamfered with respect to the chamfer 254 of the boss 248.

The manner of use of the claw 200 is substantially similar to that of the claw 10, with the certain exceptions noted above caused by constructional differences. It will be appreciated that while the claws 10 and 200 represent preferred embodiments of the present invention, obvious modifications in these exemplary embodiments could readily be made by one of ordinary skill in the art without departing from the spirit of the present invention. Furthermore, certain principles of the present invention are not limited to a top unloading claw. In addition, certain features of one embodiment could be readily substituted for certain features of the other, without incorporating all of such features. For example, the claw 10 could be provided with the segmented boss and collar of the second embodiment, along with the upstanding bolt 236 and clamping nut 244, without also incorporating the rigid nipples 224. Likewise, the rigid nipples of the claw 200 could be retained while utilizing the concept of four sets of quarter turn threads found in the first embodiment. It will be seen that many variations can be made in the exemplary embodiments illustrated herein without departing from the spirit of the present invention.

What is claimed is:

1. A barrel claw for use in obtaining milk from the teats of a cow's udder comprising:

a hollow body having a pair of opposite ends and an internal milk-receiving chamber, said body having a plurality of inlets for admitting multiple streams of milk into the chamber from the cow and outlet structure for discharging milk from the chamber toward a downstream point of delivery, at least one of said ends having an observation window permitting visual examination of the chamber from outside the body, said body including a generally cylindrical central portion and a pair of tapering end portions on opposite sides of the central portion converging toward said ends.

2. A barrel claw as claimed in claim 1, each of said tapering end portions being generally conical.

3. A barrel claw as claimed in claim 1, there being an observation window at both ends of the body.

4. A barrel claw as claimed in claim 1, said claw being adapted for top unloading, said tapered end portions and the cylindrical central portion of the body including a top wall section extending from one end of the body to the opposite end thereof, said outlet structure including an assembly having an upright extraction tube provided with an intake located within the chamber adjacent said bottom wall section, said assembly further including a discharge spout communicating with the extraction tube and located outside the chamber above said top wall section.

5. A barrel claw as claimed in claim 4, said discharge spout being detachably secured to said cylindrical, central portion of the body.

6. A barrel claw as claimed in claim 5, said discharge spout being threadably secured to the body.

7. A barrel claw as claimed in claim 6, said top wall section and said spout having quarter turn intermeshing threads that permit the spout to be tightly secured to or released from the body after approximately 90° of relative rotation between the spout and the body, said spout being disposed to project generally radially from the upright axis of said extraction tube, there being at least two separate sets of said quarter turn threads offset by approximately 90° from one another such that the spout may be selectively oriented in either of two different approximately 90° offset, radially projecting positions.

8. A barrel claw as claimed in claim 7, said top wall section having a hole and an upstanding, annular boss that circumscribes the hole in radially outwardly spaced relation thereto, said spout having a downwardly projecting collar received by said boss, said quarter turn intermeshing threads being on the collar and the boss.

9. A barrel claw as claimed in claim 8, said top wall section including an annular ledge above and around the hole inboard of the boss, said collar having a downwardly facing annular groove overlying said ledge in opposed relationship thereto, said groove having an annular seal received therein in a manner to make sealing engagement with said ledge when the spout is threadably secured to the body.

10. A barrel claw as claimed in claim 9, said extractor tube comprising a separate part from said spout and having an upper annular end received within said hole in the top wall section, said upper annular end of the extractor tube having an annular edge that faces said seal in the collar and makes sealing engagement therewith when the spout is threadably secured to the body.

11. A barrel claw as claimed in claim 5, said top wall section having a hole and an upstanding boss circumscribing said hole, said boss being segmented to present a circumferential series of alternating, upstanding tabs and slots, said spout having a collar provided with a circumferential series of alternating, depending tabs and slots, said body having an upstanding bolt secured at its lower end to said bottom wall section of the body and projecting upwardly through and beyond said hole and the spout, said bolt being provided with a nut threaded onto the distal end thereof above the spout in disposition to releasably clamp the spout down against the body with the tabs and slots of the collar matingly interfitted between the tabs and slots of the boss.

12. A barrel claw as claimed in claim 11, said boss defining a receiving socket and having an internal chamfer converging toward said hole to present a seat, said socket having an annular gasket received therein and provided with a generally conical base complementally and sealingly engaging said seat, said gasket having a central bore, said extractor tube comprising a separate part from said spout and having an upper annular end received within said bore in the gasket, said upper annular end of the extractor tube having an outwardly flared, annular edge that sealingly engages the gasket within said bore when the nut is tightened on the bolt.

13. A barrel claw as claimed in claim 11, said spout being disposed to project generally radially from the upright axis of said extraction tube, said spout and collar being rotatable as a unit relative to said boss when the nut is loosened and the collar and spout are raised relative to the boss whereby the spout may be selectively oriented in any one of a number of radially extending positions relative to an axis extending between said opposite ends of the body.

14. A barrel claw as claimed in claim 1; and a vacuum distribution manifold having a plurality of distribution ports connectable with respective pulsation lines leading to pulsation chambers of corresponding teat cups, said manifold having at least one supply port communicating with said distribution ports and connectable with a source of pulsating negative pressure, said claw being adapted for top unloading, said tapered end portions and the cylindrical central portion of the body including top and bottom wall sections extending from one end of the body to the opposite end thereof, said outlet structure including an assembly having an upright extraction tube provided with an intake located within the chamber adjacent said bottom wall section, said assembly further including a discharge spout communicating with the extraction tube and located outside the chamber above said top wall section, said milk discharge spout and said vacuum distribution manifold being rigidly connected to one another to present a combination spout and manifold unit, said combination spout and manifold unit being detachably secured to said cylindrical, central portion of the body.

15. A barrel claw as claimed in claim 14, said combination spout and manifold unit being threadably secured to the body.

16. A barrel claw as claimed in claim 15, said top wall section and said combination spout and manifold unit having quarter turn intermeshing threads that permit the unit to be tightly secured to or released from the body after approximately 90° of relative rotation between the unit and the body, said spout being disposed to project generally radially from the upright axis of said extraction tube, there being at least two separate sets of said quarter turn threads offset by approximately 90° from one another such that the spout may be selectively oriented in either of two different approximately 90° offset, radially projecting positions.

17. A barrel claw as claimed in claim 14, said top wall section having a hole and an upstanding boss circumscribing said hole, said boss being segmented to present a circumferential series of alternating, upstanding tabs and slots, said combination spout and manifold unit having a collar provided with a circumferential series of alternating, depending tabs and slots, said body having an upstanding bolt secured at its lower end to said bottom wall section of the body and projecting upwardly through and beyond said hole and the combination spout and manifold unit, said bolt being provided with a nut threaded onto the distal end thereof above the combination spout and manifold unit in disposition to releasably clamp the unit down against the body with the tabs and slots of the collar matingly interfitted between the tabs and slots of the boss.

18. A barrel claw as claimed in claim 17, said spout being disposed to project generally radially from the upright axis of said extraction tube, said combination spout and manifold unit being rotatable relative to said boss when the nut is loosened and the unit is raised relative to the boss whereby the spout may be selectively oriented in any one of a number of radially extending positions relative to an axis extending between said opposite ends of the body.

19. A barrel claw as claimed in claim 1, said tapered end portions and the cylindrical central portion of the body including a top wall section extending from one end of the body to the opposite end thereof, said inlets comprising openings in the tapered end portions of said top wall section adapted to receive and removably retain the outlet ends of a corresponding number of flexible teat cup liners.

20. A barrel claw as claimed in claim 1, said tapered end portions and the cylindrical central portion of the body including a top wall section extending from one end of the body to the opposite end thereof, said inlets comprising a plurality of outwardly and upwardly projecting, rigid, tubular nipples fixed to the top wall section in said tapered end portions of the body and communicating with said chamber.

21. A barrel claw as claimed in claim 20, each of said tapering end portions being generally conical, each of said nipples having a longitudinal axis intersecting said top wall section at a substantially 90° angle.

22. A barrel claw as claimed in claim 1, said at least one end of the body including a cylindrical rim, said rim having an interior, annular, beveled surface that progressively decreases in diameter as the central portion of the body is approached, said window being disposed within said rim and having a beveled circumferential edge complementally received by said beveled surface of the rim, said beveled surface and said edge having oppositely facing, annular grooves, said groove in the edge of the window containing a resilient seal that projects into the groove in the beveled surface of the rim whereby to yieldably retain the window in place.

23. A top unloading barrel claw for use in obtaining milk from the teats of a cow's udder comprising:

a generally cylindrical hollow body having an internal receiving chamber, said body having a longitudinal axis and a pair of opposite ends disposed along said axis, at least one of said opposite ends of the body being provided with an observation window permitting visual examination of the chamber from outside the body, said body having a top wall section and a bottom wall section;

a plurality of inlets in said top wall section for admitting multiple streams of milk into the chamber from the cow;

a top unloading outlet assembly for discharging milk from the chamber toward a remote, downstream point of delivery, said outlet assembly including an upright discharge tube having an upright axis and a lower intake end located within the chamber adjacent said bottom wall section, said outlet assembly further including a spout above the top wall section in communication with the discharge tube and projecting generally radially from said axis of the tube; and structure detachably securing said outlet assembly to the top wall section of the body in any selected one of a number of alternative rotative positions about said axis of the tube for orienting the spout in a selected radial position.

24. A barrel claw as claimed in claim 23, said outlet assembly being threadably secured to the body.

25. A barrel claw as claimed in claim 24, said top wall section and said outlet assembly having quarter turn intermeshing threads that permit the outlet assembly to be tightly secured to or released from the body after approximately 90° of relative rotation between the outlet assembly and the body, there being at least two separate sets of said quarter turn threads offset by approximately 90° from one another such that the spout may be selectively oriented in either of two different approximately 90° offset, radially projecting positions.

26. A barrel claw as claimed in claim 25, said top wall section having a hole and an upstanding, annular boss that circumscribes the hole in radially outwardly spaced relation thereto, said outlet assembly including a downwardly projecting collar received by said boss, said quarter turn intermeshing threads being on the collar and the boss.

27. A barrel claw as claimed in claim 26, said top wall section including an annular ledge above and around the hole inboard of the boss, said collar having a downwardly facing annular groove overlying said ledge in opposed relationship thereto, said groove having an annular seal received therein in a manner to make sealing engagement with said ledge when the outlet assembly is threadably secured to the body.

28. A barrel claw as claimed in claim 27, said extractor tube comprising a separate part from said spout and having an upper annular end received within said hole in the top wall section, said upper annular end of the extractor tube having an annular edge that faces said seal in the collar and makes sealing engagement therewith when the outlet assembly is threadably secured to the body.

29. A barrel claw as claimed in claim 23, said top wall section having a hole and an upstanding boss circumscribing said hole, said boss being segmented to present a circumferential series of alternating, upstanding tabs and slots, said outlet assembly including a collar provided with a circumferential series of alternating, depending tabs and slots, said body having an upstanding bolt secured at its lower end to said bottom wall section of the body and projecting upwardly through and beyond said hole and the spout, said bolt being provided with a nut threaded onto the distal end thereof above the spout in disposition to releasably clamp the spout down against the body with the tabs and slots of the collar matingly interfitted between the tabs and slots of the boss.

30. A barrel claw as claimed in claim 29, said boss defining a receiving socket and having an internal chamfer converging toward said hole to present a seat, said socket having an annular gasket received therein and provided with a generally conical base complementally and sealingly engaging said seat, said gasket having a central bore, said extractor tube comprising a separate part from said spout and having an upper annular end received within said bore in the gasket, said upper annular end of the extractor tube having an outwardly flared, annular edge that sealingly engages the gasket within said bore when the nut is tightened on the bolt.

31. A barrel claw as claimed in claim 30, said spout and collar being rotatable as a unit relative to said boss when the nut is loosened and the collar and spout are raised relative to the boss whereby the spout may be selectively oriented in any one of a number of radially extending positions.

32. A barrel claw as claimed in claim 23; and a vacuum distribution manifold having a plurality of distribution ports connectable with respective pulsation lines leading to pulsation chambers of corresponding teat cups, said manifold having at least one supply port communicating with said distribution ports and connectable with a source of pulsating negative pressure, said discharge spout and said vacuum distribution manifold being rigidly connected to one another to present a combination spout and manifold unit, said combination spout and manifold unit being detachably secured to said cylindrical, central portion of the body.

33. A barrel claw as claimed in claim 23, said body including a generally cylindrical central portion and a pair of tapering end portions on opposite sides of the central portion converging toward said ends.

34. A barrel claw as claimed in claim 23, said at least one end of the body including a cylindrical rim, said rim having an interior, annular, beveled surface that progressively decreases in diameter as the central portion of the body is approached, said window being disposed within said rim and having a beveled circumferential edge complementally received by said beveled surface of the rim, said beveled surface and said edge having oppositely facing, annular grooves, said groove in the edge of the window containing a resilient seal that projects into the groove in the beveled surface of the rim whereby to yieldably retain the window in place.

35. A barrel claw for use in obtaining milk from the teats of a cow's udder comprising:

a hollow body having a pair of opposite ends and an internal milk-receiving chamber, said body having a plurality of inlets for admitting multiple streams of milk into the chamber from the cow and outlet structure for discharging milk from the chamber toward a downstream point of delivery, at least one of said ends having an observation window permitting visual examination of the chamber from outside the body, said at least one end of the body including a cylindrical rim, said rim having an interior, annular, beveled surface that progressively decreases in diameter as the central portion of the body is approached, said window being disposed within said rim and having a beveled circumferential edge complementally received by said beveled surface of the rim, said beveled surface and said edge having oppositely facing, annular grooves, said groove in the edge of the window containing a resilient seal that projects into the groove in the beveled surface of the rim whereby to yieldably retain the window in place.

36. A barrel claw as claimed in claim 35, said body including a generally cylindrical central portion and a pair of tapering end portions on opposite sides of the central portion converging toward said ends.

37. A barrel claw as claimed in claim 36, each of said tapering end portions being generally conical.

38. A barrel claw as claimed in claim 37, both of said ends of the body having an observation window.

39. A barrel claw as claimed in claim 35, both of said ends of the body having an observation window.

\* \* \* \* \*